Aug. 14, 1945.   F. H. ROHR   2,382,259
ROTARY COMBUSTION ENGINE
Filed April 16, 1943   7 Sheets-Sheet 1

FRED H. ROHR,
INVENTOR.

BY *Everett N. Curtis*

ATTORNEY.

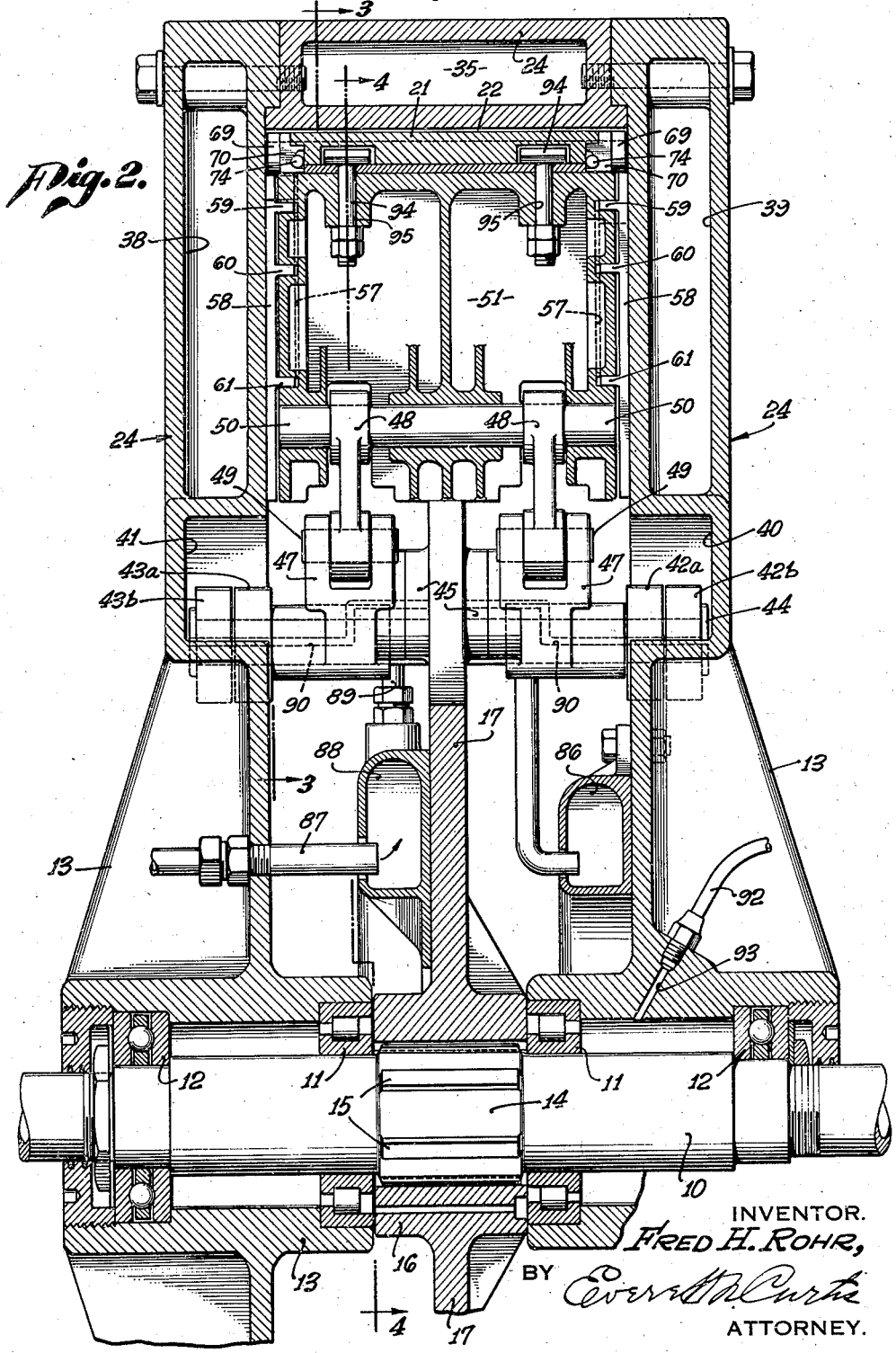

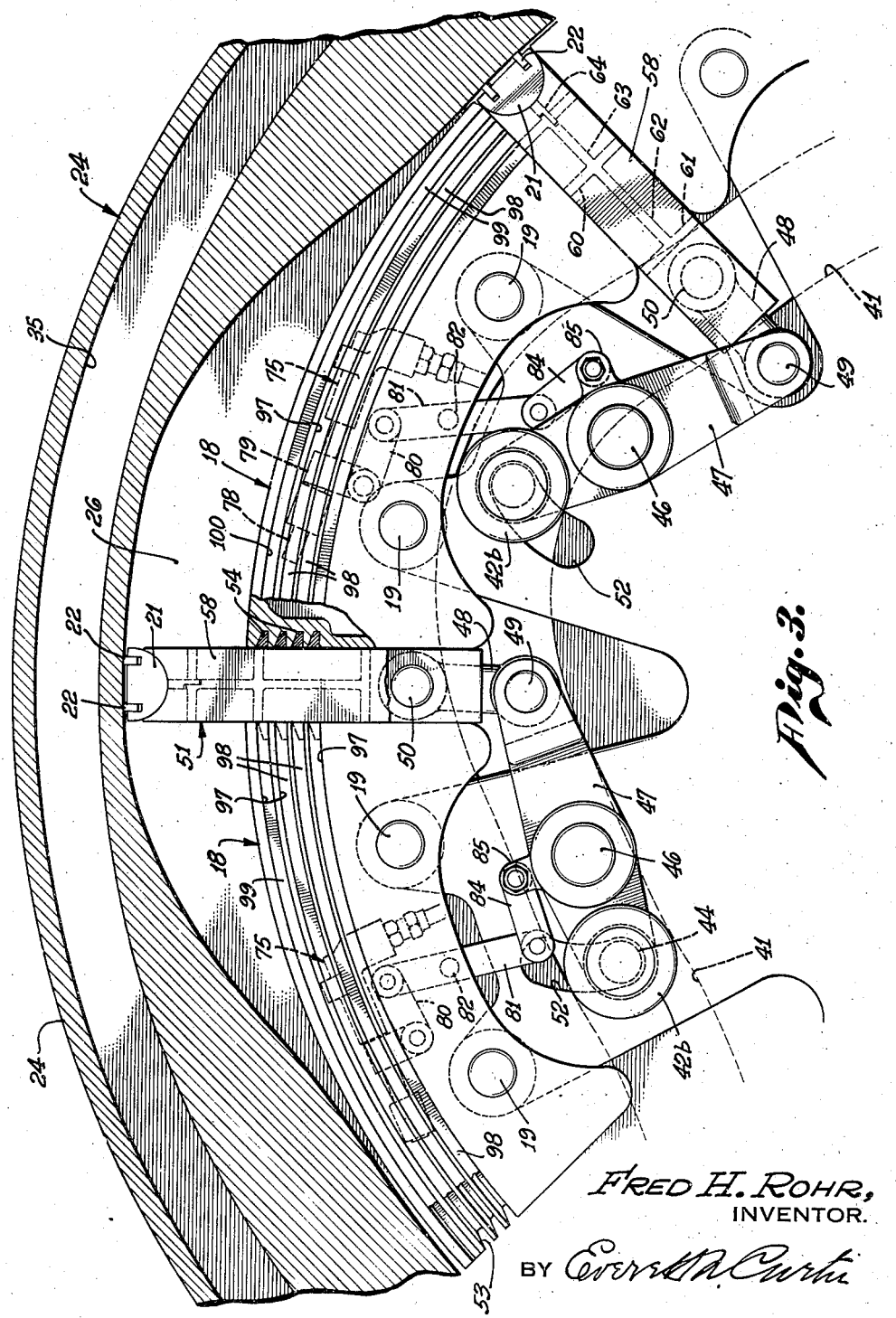

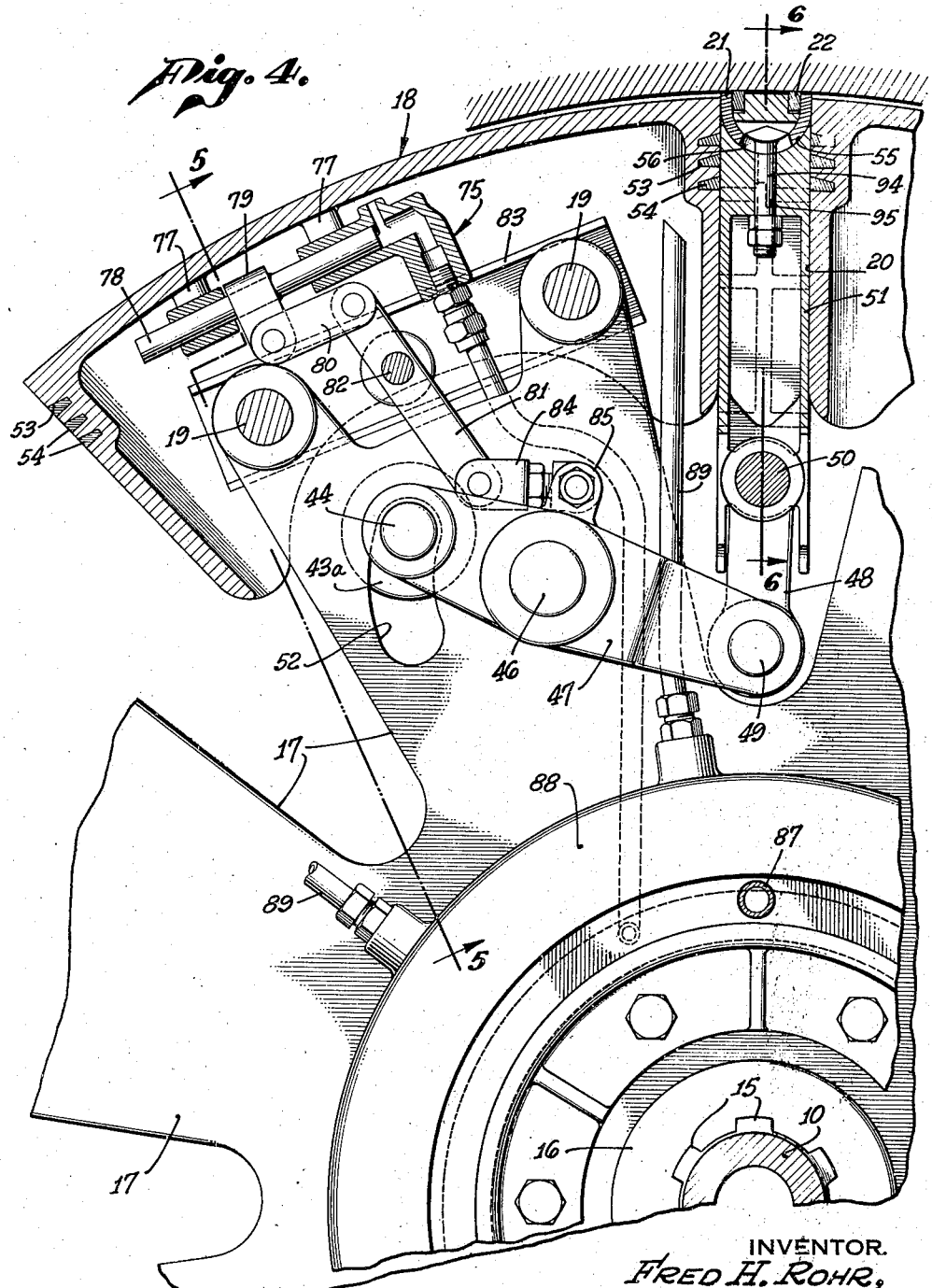

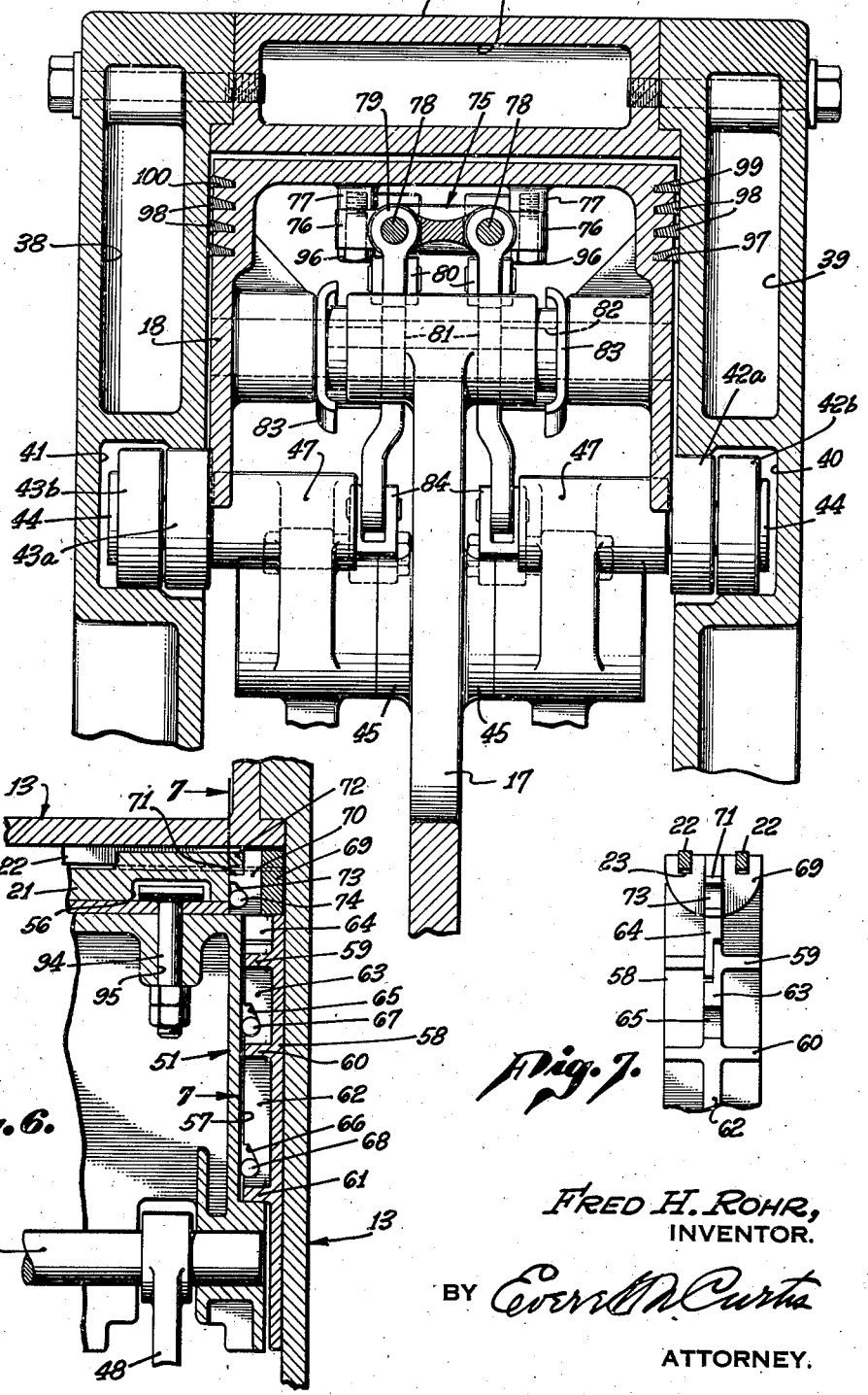

Aug. 14, 1945.   F. H. ROHR   2,382,259
ROTARY COMBUSTION ENGINE
Filed April 16, 1943   7 Sheets-Sheet 6

FRED H. ROHR,
INVENTOR.

BY

ATTORNEY.

STEPS OF OPERATIONS

1. INTAKE
2. COMPRESSION
3. FIRING
4. EXHAUST

FRED H. ROHR,
INVENTOR.

BY *[signature]*

ATTORNEY.

Patented Aug. 14, 1945

2,382,259

UNITED STATES PATENT OFFICE 2,382,259

ROTARY COMBUSTION ENGINE

Fred H. Rohr, San Diego, Calif.

Application April 16, 1943, Serial No. 483,262

3 Claims. (Cl. 123—16)

My invention relates to rotary combustion engines, and its objects are to provide a more efficient and operative mechanism; to economize in the use of fuel; to provide a small and compact engine of light weight and greater horsepower than has heretofore been used for the purpose, and to bring about other advantages more specifically hereinafter set forth.

My improved engine has been designed as a torque motor, made possible by the circular disposition of the working chambers. One great advantage of my engine is the more effective transmission of compressed air and gases from the intake side, through the compression chamber and into the working or explosion chamber. This arrangement embodies a perfect turbulent chamber when used for igniting of the fuels or gases; and also makes possible a very high combustion speed.

My invention constitutes a radical departure from the ordinary rotary combustion engine well known in the art, in that there is provided through my improved construction, in a manner never before accomplished, absolutely controlled turbulence. Turbulence is understood in the art to mean the correct circulation of air in the combustion chamber to bring about complete intermingling of fuel and air. After turbulence is accomplished, the condition known as the burning or combustion takes place and, through the utilization of my improved engine, scavenging after burning, is 100% complete. This is a result which is not accomplished satisfactorily by any combustion engine known in the prior art; the nearest approach to such scavenging being through the employment of the Diesel engine, whose residuum is about 8%, while in an ordinary combustion engine, the residuum is about 20% of the cylinder volume.

In the cylinder and piston construction of Diesel and other combustion engines, there always is left a space between the inner wall of the end of the cylinder and the wall at the end of the piston so that there remain appreciable amounts of the products of combustion which, on the downward stroke of the piston and the admission of air and gases into the cylinder, result in contamination of the explosive mixture. These amounts which are left in the space between the end of the cylinder and the piston ring constitute the residual amounts above referred to which in said engines have been found impossible to scavenge.

In my improved engine, I have provided a constant lever arm the movement of which is at all times positively controlled and by means of which it is possible to maintain and utilize high pressure at the beginning of combustion at full leverage. This is a novel conception insofar as its application to a Diesel engine is concerned. A somewhat similar application of the principle has been tried with ordinary combustion engines but it has been found impossible to obtain the result attained by my invention in a reciprocating engine, or any engine having a crank or swash plate or wobble disk. Perfectly controlled turbulence and the presence of the constant leverage arm of my improved engine are outstanding features. Accordingly, through the use of my invention, I am enabled to effect substantially complete combustion and this is accomplished practically through the use of said controlled turbulence.

Attention is hereby directed to the drawings illustrating a preferred form of my invention in which similar numerals of designation refer to similar parts throughout several views, and in which—

Figure 2 is a section on line 2—2 of my improved apparatus, shown in Figure 1, looking in the direction of the arrows, the said view illustrating the interior mechanism of my invention and location of the vanes, as well as the method of lubricating and cooling the said mechanism;

Figure 3 is an enlarged section on line 3—3 of Fig. 2 of my apparatus, looking in the direction of the arrows showing the pumps and other parts adjacent to one of the vanes and illustrating the method of scavenging the cooling oil;

Figure 4 is an enlarged longitudinal section on line 4—4 of Fig. 2, looking in the direction of the arrows showing the parts adjacent to one of the vanes, as well as the scavenger pump and adjacent parts;

Figure 5 is a section on line 5—5 of my improved apparatus shown in Figure 4 looking in the direction of the arrows and showing the method of sealing the headers and the vanes;

Figure 6 is a section on line 6—6 of a portion of my apparatus shown in Figure 4, looking in the direction of the arrows;

Figure 7 is a section of part of one of the vanes, showing the sealing method;

Figure 1:
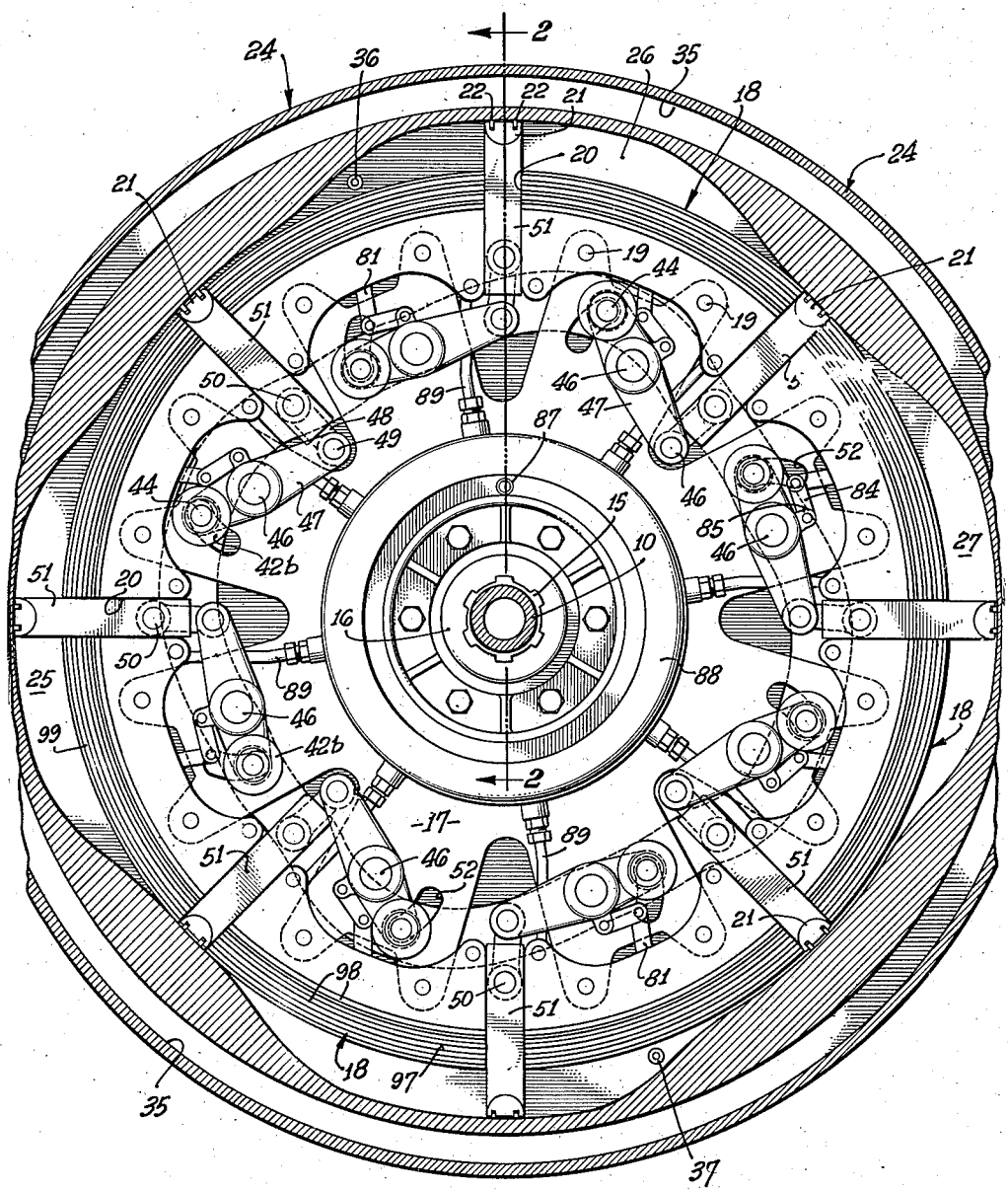
Figure 1 is a view illustrating the interior mechanism of my invention upon the casing being removed; such view showing the operating mechanism controlling the vanes.
Figure 8:
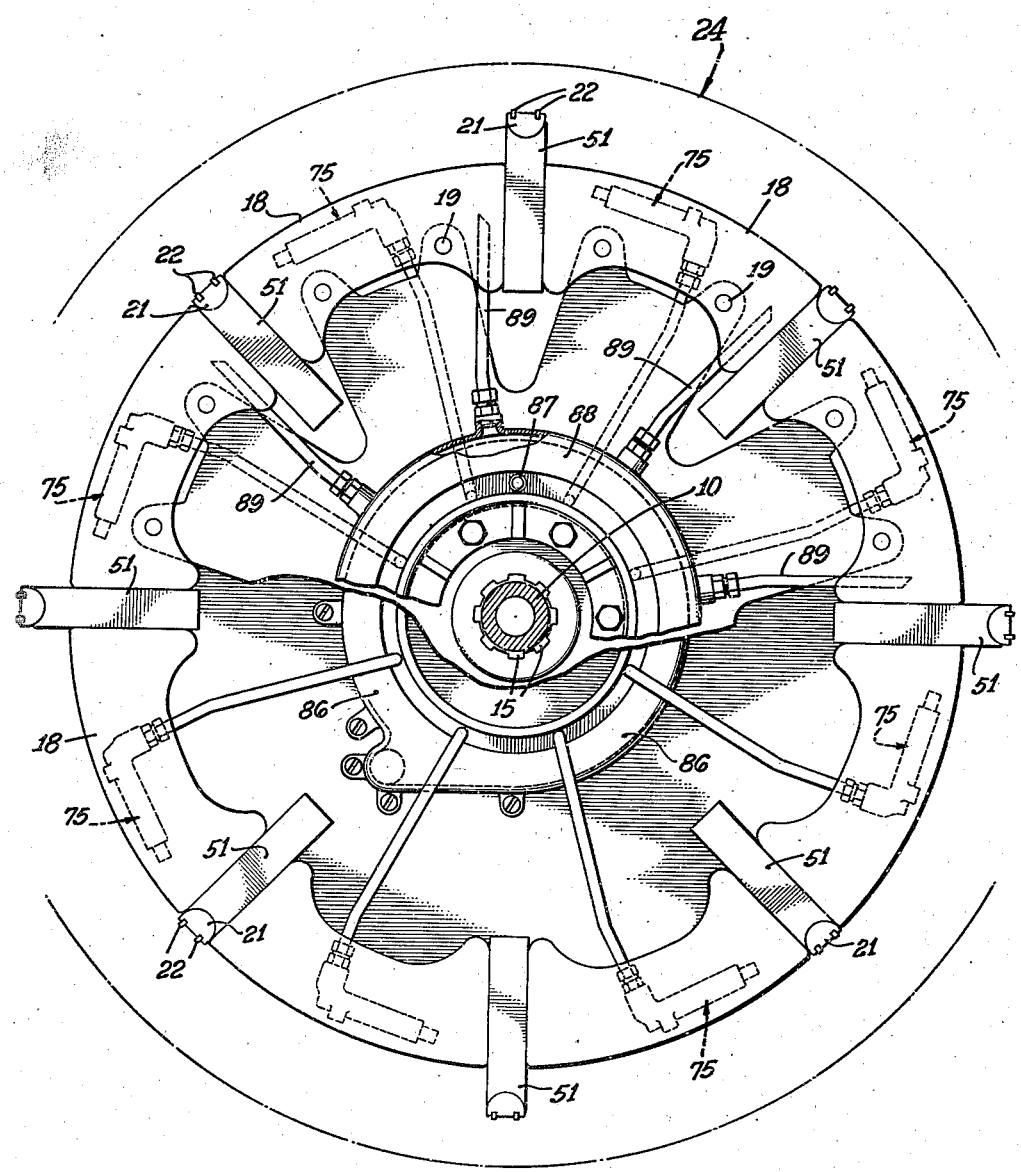
Figure 8 is a view of the interior mechanism of my improved apparatus with certain of the parts being removed for the purpose of illustrating the internal cooling, oiling and scavenging system.

Referring to the drawings, the main shaft 10 is of the usual construction well known in the art and may be connected, in any of the well known ways, to some suitable source of power. This shaft 10 is journalled in bearings 11 and 12, mounted upon the main frame or casing 13, bearings 11 being the well known form of construction of roller bearings and bearings 12 being in the form of the well known construction of ball thrust bearings. In the middle portion of the main shaft 10, is shown the annular enlargement 14, which is connected by splines 15 to the hub 16. Integral with the hub 16 is the spider 17 which completely surrounds the shaft and which is connected at its outer edges with the floating segments 18 which are eight in number and are separably mounted upon the said spider by wrist pins 19, of which there are sixteen—two for each segment 18. Each of said segments 18 as shown is of hollow construction in order to permit the insertion therein of one of the radial arms of said spider and also to allow the insertion of a pair of the pumps 75, hereinafter described, for scavenging oil (see Fig. 4). The construction and mounting of each of these segments is such that without disturbing the others it can readily be removed or installed for cleaning, repair or replacement through manipulation of said wrist pins, upon which said segments may be said to rest and to be in floating contact with said spider. The splines 15 and the wrist pins 19 are provided for the purpose of securing better alignment of said segments. As will be noted from the drawings, each of the segments 18 is not only separable from the others and independently mounted, but also there is provided between the ends of adjoining segments, a rectangular pocket or well 20, within each of which is disposed a reciprocating vane 51, which is rectangular in construction and which is provided at its outer end with a rocking shoe 21 shaped to engage with outer wall of the chambers hereinafter referred to. Each of these shoes 21 is secured to the end of its vane in such a manner as to oscillate but not to be dislodged by reason of centrifugal force. Each of said shoes 21 is also provided with sealing strips 22 which are carried in grooves 23, the purpose of said sealing strips being to seal the ends of the vanes against the adjacent chamber wall surfaces over which they are to ride or travel in the way and manner hereinafter to be explained. As shown in the drawings, there is, except for the contact of these strips 22 with the walls of said surfaces, complete running clearance at all times between said walls and the shoes of said vanes.

Figure 9:
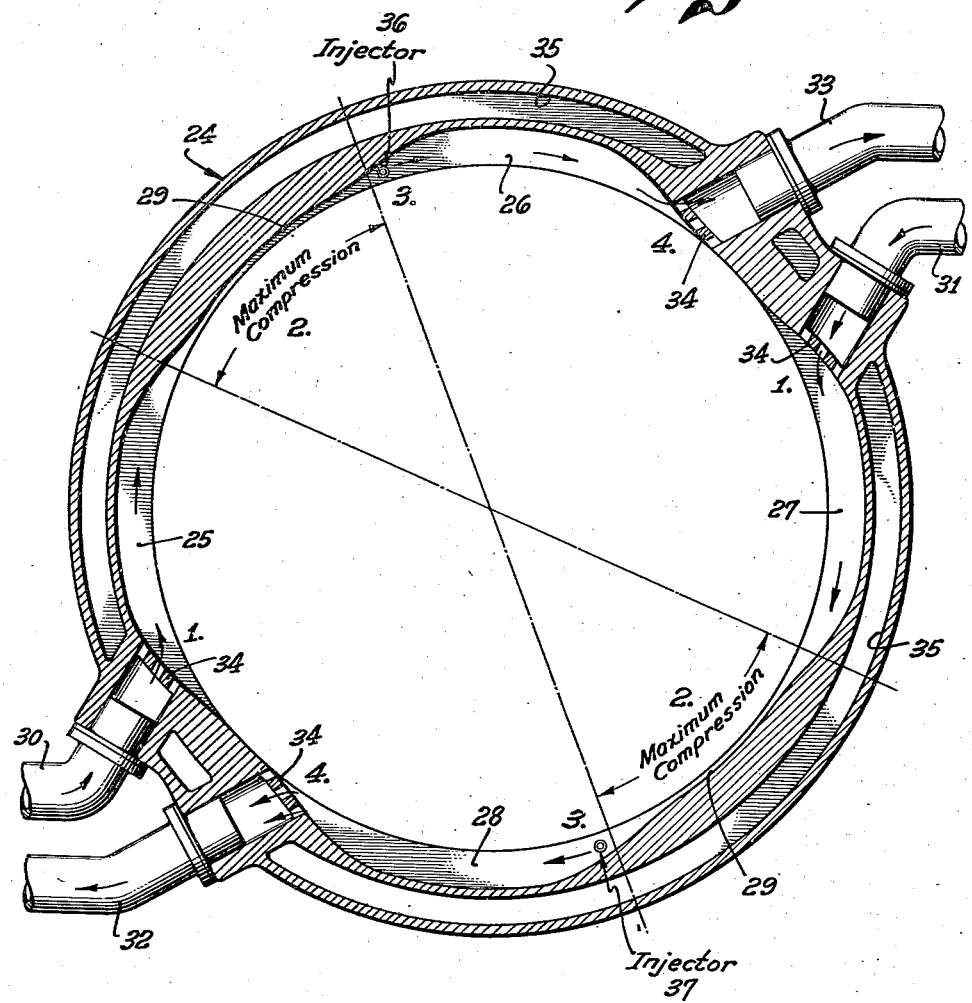
Figure 9 is a view showing, diagrammatically, the steps of operation of my improved apparatus.

Within the said casing 13 are provided the chambers 25, 26, 27 and 28; 25 and 27 being intake chambers and 26 and 28 being expansion chambers. Located between chambers 25 and 26 and between the chambers 27 and 28 are compression chambers 29 and 29, such compression chambers each constituting an area which is very closely confined by reason of the close approach of the outer wall of said chambers to the wall of the segments 18, adjacent thereto (see Fig. 9). These chambers form two sets of continuously curved passageways each of which includes an intake chamber, compression chamber and expansion chamber and each of which passageways is located within the outer wall of the casing opposite to the other and just outside of the outer walls of the segments 18. For the purpose of admitting air to these chambers, I preferably provide, on opposite sides of the casing 24, the intake ports 30 and 31; and also similarly situated at opposite sides of said casing are the exhaust ports 32 and 33. As will be observed, there is inserted in the mouth of each of these ports, a grating 34, the purpose of which is to prevent breakage or injury to the sealing strips 22, or the shoes 21.

Preferably the chambers 25 and 27 are of equal size, form and extent, and the chambers 26 and 28 and chambers 29 and 29 are likewise of equal dimensions. Within the casing wall 24, I preferably provide the hollow space 35, the walls of which form the water jacket enclosing the chambers above referred to. The water to these water jackets may be admitted and discharged in any of the ways well known in the art.

Affixed to the walls of the casing, adjacent to the extreme ends of the chambers 26 and 28, are the injectors 36 and 37, the said injectors serving in the manner common to all Diesel engines to spray within the said chambers 26 and 28 the fuel oil. Also within the casing wall 24, at the sides thereof and incorporated therein, are the water jackets 38 and 39 which are preferably connected and to which water may be admitted and discharged in any manner well known in the art. Within the said wall casing 24, upon opposite sides thereof, are formed the groove cams 40 and 41, the upper and lower surfaces of which conform with the surface of the continuous outer wall of said chambers and which extend circumferentially around the main shaft and receive, between their opposing surfaces, cam rollers 42a, 42b, 43a and 43b, the said rollers being mounted upon the ends of a shaft 44 extending through an opening 52 in the spider 17 and through the ends of the vane actuating rocker arms 47. The said cam rollers are mounted and constructed in pairs, as shown in the drawings; one of said pairs comprising rollers 42a and 42b, and the other pair of rollers comprising rollers 43a and 43b. Preferably, one roller of said pair is mounted so that its periphery will always be in contact with the lower surface of the cam groove 40, while the surface of the other roller of said pair will always be in contact with the upper surface of the said cam groove, the purpose of such arrangement being to distribute the load equally between the said rollers by permitting one of said rollers to revolve in one direction while the other roller revolves in the other direction, each roller serving to counterbalance the other and thereby avoiding any undue stress and strain which might be occasioned if only one roller were used instead of a pair of rollers.

Integral with the spider 17, and extending on each side thereof, are the bosses 45; each of said bosses carrying a fulcrum pin 46, and mounted upon said pin 46 is a rocker arm 47, which is so constructed and arranged as to rock readily upon said pin 46. One end of each of said rocker arms 47 is pivotally connected with an actuating cam roller shaft 44, and the other end of each of said rocker arms is pivotally connected by a pin 49 with a link 48, which is swingingly connected by a pin 50 with the lower end of each of the vanes 51. The purpose of each of said rocker arms and its connections is to take the load off of the vanes 51 when in rotation on the spider 17, thereby providing a running clearance at all times at the top of each of said vanes; the cam surfaces and the contour of the outer wall of the chambers being formed and co-ordinated for such purpose.

As will be observed in Figure 4, the middle portion of the shaft 44 oscillates through an arcuate opening 52 in the spider 17, the purpose of such opening being to permit the movement of the short end of the rocker arm 47 in the manner to be hereinafter described.

The construction of my improved vane 51 will now be described: With the exception of not being round and being constructed in rectangular form, my improved vane is somewhat similar in purpose and operation as the conventional trunk pistons of a Diesel or gasoline engine. It is to be borne in mind, however, that my improved vane serves an entirely different purpose from that of these prior constructions, and that there are very radical differences and modifications in my improved vane from the pistons of the prior art.

Preferably, my improved vane is rectangular in form and has its interior parts cut away for economy in the use of weight and metal. As before described, at the top end of each of my vanes is provided a shoe 21, and radial reciprocation of each vane is effected through the rectangular pocket or well 20 by reason of the connection of the lower end of said vane with the rocker arm 47. The lower part of each of the shoes 21 is made circular in shape for the purpose of providing a rocking contact with the circular or cylindrical shaped trough 55 at the top of the vane, and in order to insure the proper engagement of each of said shoes with each trough. I prefer to provide, in the lower wall of each trough, arcuate grooves 56 which are shaped to engage with the head of the bolts 94, each of which is secured in an opening 95 passing through the upper wall of the vane 51. In order to secure effective sealing of the faces of said vane, during the said reciprocation, I preferably provide the interior of said well 20 with elongated grooves 53. The said grooves being formed in the opposite faces of the segments 18, and being shaped to receive sealing strips 54 in the manner well known in the art. The shape, however, of both said elongated grooves and strips is such that the operation of centrifugal force provides an effective seal. Thus, it will be observed that the said grooves are so formed that the upper wall of said groove is made at an angle with the lower wall, so as effectively to bring about the said sealing effect. These sealing strips 54 are preferably of cast iron, but may be of any material suitable for the purpose.

In order to provide for the proper sealing of the sides of each of the vanes during reciprocation, I form, in the side of each vane, a depression 57 shaped to engage with the sealing plate 58 which is provided with the laterally extending ribs 59, 60 and 61, and the longitudinally extending ribs 62 and 63. In the edges of both of the ribs 62 and 63, I provide the angularly shaped wedging slots 65 and 66, within which repose the rollers 67 and 68.

At the end of each end of each of the shoes 21, I have provided an end plate 69 which is provided with a rib 70 shaped to engage with a recess in said shoe and being prevented from dislodgment by reason of a shoulder 71 engaging with an abutment 72, as shown in Figure 6. For the purpose of enabling said strip 69 to act as a sealing strip in the same manner and form as the sealing plate 58, I provide in the rib 70, a slot 73 and roller 74 (similar to slots 65 and 66, and the rollers 67 and 68) which act in the same way and for the same purpose. For the purpose of further sealing the end strip 69, I preferably provide the detachable rib section 64 which serves as a continuation of the rib 63 and operates by reason of centrifugal force upon the lower edge of the strip 69, so as to force same upwardly and effectuate further sealing thereof. As will be observed from Figure 7, the said strip 64 is shaped to form a separable slip joint with the rib 63, while being left free to move upwardly by reason of the centrifugal force above referred to.

The segments 18 which, as heretofore described, are hollow, eight in number and mounted upon the periphery of the spider 17 are of special construction. All of these segments are of the same shape and size and are so constructed as to be readily removed for the purpose of replacement and repair. In order to provide an effective seal of the sides of the said segments, I preferably provide the same on the outside walls thereof with the arcuate grooves 97 which are concentric one with each other and which receive the sealing strips 98. These grooves are shaped in cross section, together with the said sealing strip, similar to the grooves 53 and sealing strips 54, and act in the same manner and serve the same purpose. The said segments are also provided with an outer arcuate groove 100 within which reposes the sealing strip 99 which acts as a fire ring; the construction of the said groove and strip being similar to grooves 97 and 100.

For the purpose of scavenging the oil which collects inside of the hollows of each of the segments, I preferably provide eight pairs of pumps 75, each of which is preferably of duplicate construction and is provided with a double set of actuating links and levers in order that one of the pair alone may serve the purpose of scavenging if, for any reason, the other should get out of order. The reason for the provision of these pumps is that any accumulation of oil, within the segments, which is not removed would result in unbalanced running and by-pass of excess oil by the vanes and segments which would allow the engine to overspeed. The pairs of pumps are each located within the hollow of one of the segments in the position shown in the drawings in order that the accumulation of oil at the outer portion of said hollow of the segment may be more readily removed, the centrifugal action of the engine and rotation of parts being such as to throw the oil into this outer portion. The pumps arranged in pairs as aforesaid are secured to the longer inner wall of the segment by lugs 76 secured to bosses 77, which are integral with the said wall, by means of cap screws 96. (See Fig. 5.) Each pump plunger 78 is actuated through the yoke 79 affixed thereto, and which is pivotally connected by the link 80 to the rocker arm 81, rocking upon fulcrum pin 82 secured to a plate 83 affixed to the inner wall of the segment; the outer end of the rocker arm 81 being pivotally connected by the link 84 to the lug 85, on the rocker arm 47. Suitable connections known to the art may be employed for discharging the said oil into the return collector ring 86. Preferably, the oil is conducted from the said ring to a reservoir (not shown) for the purpose of collecting, screening and purifying the oil, and later to be returned through connection 87 to collection ring 88 and, in part, to be metered through the pipe 92 and spout 93 to oil the bearings of shaft 10. One of the purposes of the oil system is to provide a means for introducing amounts of oil in excess of the amounts required for lubrication, in order that a better cooling may be effected in addition to that provided by the water jacket hereinbefore referred to. As will be observed from the drawings (see Fig. 2), the oil is introduced from the spout 87 into the collector ring 88 which ring is shown permanently attached to the spider 17 and to be revolved therewith. Upon revolution, the oil is thrown out, radially, through the pipe 89 into a passageway through the fulcrum pin and through a drill passage 90 in the rocker arm, to a drill passage in the roller shaft 44, thence to lubricate rollers 42a, 42b, 43a and 43b. It is to be observed that, in this form of mechanism, no high pressure oiling system is required. Better lubrication is effectively accomplished by reason of the centrifugal force exerted and brought about by reason of revolution of the operative parts of the engine.

The operation of my improved engine is as follows: The rotation of the spider 17 and adjacent parts is started through connections and in any of the ways well known in the art, such as for example by cranking, electric starter, inertia starter or compressed air. Upon such rotation, the shoes 21 of the vanes 51 will closely contact the surface of the continuous circumferentially extending outer wall of said chambers and rapidly sweep over the same; the cam rolls, rocker arms and connections, and cam grooves serving to bring about and constantly to maintain the said contact through co-ordination as aforesaid of said surface with that of the cam grooves through the timed reciprocation of said vanes. Air is thereupon drawn into chambers 25 and 27 through the intake ports 30 and 31, and is impelled forward by the rotary action thereon of the vanes 51 to the compression chambers 29, during which progress the incoming air is heated to a sufficiently high temperature as to cause spontaneous combustion of the fuel oil upon the same being sprayed from injectors 36 and 37 into the area of maximum compression reached by said vanes 51, which area is located at or about the juncture of chambers 29 and 26 and chambers 29 and 28. This combustion constantly continues in chambers 26 and 28 because of the air in highly heated condition being forced past the said injectors, thereby causing a higher and more perfect degree of controlled turbulence than has heretofore been found possible in the art. After such combustion has been accomplished, the waste products thereof are discharged through the exhaust ports 32 and 33, being in the process of such combustion completely scavenged. Once my engine is thus started, and combustion is thus commenced, it will continue to operate as long as fuel is supplied or until stopped by the operator.

If desired I may, as is obvious, employ in place of, or in addition to, the means of spontaneous combustion hereinbefore set forth, spark plugs of the construction well known in the art, which may be connected in any well known way with the aforesaid combustion chambers, and which may be employed to effect positively the ignition of the explosive material admitted to the said chambers in the manner well understood in the art.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the foregoing description, and all changes which come within the meaning and range of equivalency of the claims are therefore intended to be embraced therein.

What I claim and desire to secure by Letters Patent is:

1. In a rotary combustion engine, the combination of a casing, a base located within said casing and connected therewith, a shaft mounted upon said base, a structure secured to said shaft within said casing and rotating with said shaft, the outer wall of said structure being shaped to make with the inner wall of said casing a series of connected chambers forming passageways within said casing outside of said structure, a series of vanes mounted to slide radially upon said structure and encircling the same; and said casing having endless passageways therein at the sides thereof, the walls of which constitute cam grooves conforming to the contour of said inner wall of said casing, pairs of cam rollers mounted upon said structure, one of which rollers of each pair engages with the top and the other of which engages with the bottom of one of said grooves and which are connected to, and operate to reciprocate radially, said vanes upon rotation of said shaft and to maintain constant sweeping contact of the outer ends of said vanes with the inner wall of said casing, inlet means for admitting explosive material within said chambers and means for exploding the same to cause rotation of said shaft, and outlet means for the discharge of the products of combustion.

2. In a rotary combustion engine, the combination of a casing, a base located within said casing and connected therewith, a shaft mounted upon said base, a spider secured to said shaft, segments separably secured to the periphery of said spider within said casing and rotating therewith, the outer walls of said segments being shaped to make with the inner wall of said casing a series of connected chambers constituting passageways within said casing outside of said segments, and said segments being separated to form radially extending wells therebetween, a series of vanes each of which is mounted to slide in one of said wells; said casing having therein endless passageways adjacent to said inner wall thereof, the walls of which passageways constitute cam grooves conforming to the contour of said inner wall, pairs of cam rollers connected with said vanes and spider, one of which rollers of each pair engages with the top and the other of which engages with the bottom of one of said grooves and which operate to reciprocate radially said vanes upon rotation of said shaft and to maintain constant contact of the outer ends of said vanes with the inner wall of said casing, inlet means for admitting explosive material within said chambers and means for exploding the same to cause rotation of said shaft, and outlet means for the discharge from said chambers of the products of combustion.

3. In a rotary combustion engine, the combination of a casing, a base located within said casing and connected therewith, a shaft mounted upon said base, hollow segments secured to said shaft within said casing and rotating with said shaft, the outer walls of said segments being shaped to make with the inner wall of said casing a series of connected chambers forming passageways within said casing outside of said segments, and said segments being separated to form radially extending wells therebetween, a series of vanes mounted to slide radially in said wells and encircling said shaft, means connected with said shaft for radially reciprocating said vanes upon rotation of said shaft to maintain constant sweeping contact of the outer ends of said vanes with the inner wall of said casing, means centrifugally exerted for supplying lubrication to said operative parts, and pumps and connections radially secured to said structure and operating to remove excess lubricants collecting inside of said segments by reason of centrifugal action exerted by rotation of said shaft, inlet means for admitting air and explosive material within said chambers and means for exploding the same to cause rotation of said shaft, and outlet means for removing the products of combustion.

FRED H. ROHR.